United States Patent
Cheng

(10) Patent No.: US 8,166,869 B2
(45) Date of Patent: May 1, 2012

(54) INFUSION ASSEMBLY FOR BEVERAGE PREPARING MACHINE

(75) Inventor: Rocky Cheng, Taipo (HK)

(73) Assignee: Perfect Steam Appliances Ltd., Fo Tan, Shatin, N.T. (HK)

( * ) Notice: Subject to any disclaimer, the term of this patent is extended or adjusted under 35 U.S.C. 154(b) by 471 days.

(21) Appl. No.: 12/307,691

(22) PCT Filed: Jul. 4, 2007

(86) PCT No.: PCT/IB2007/001979
§ 371 (c)(1),
(2), (4) Date: Jan. 6, 2009

(87) PCT Pub. No.: WO2008/004116

PCT Pub. Date: Jan. 10, 2008

(65) Prior Publication Data
US 2009/0249961 A1    Oct. 8, 2009

(30) Foreign Application Priority Data
Jul. 6, 2006  (IT) .............................. MI2006A1307

(51) Int. Cl.
*A47J 31/40*    (2006.01)
(52) U.S. Cl. ........................................ 99/302 P; 99/295
(58) Field of Classification Search .................... 99/295, 99/302 P, 302 R, 297
See application file for complete search history.

(56) References Cited

U.S. PATENT DOCUMENTS

| | | | |
|---|---|---|---|
| 5,755,149 A * | 5/1998 | Blanc et al. | 99/289 T |
| 7,350,456 B2 * | 4/2008 | Blanc et al. | 99/302 P |
| 7,703,380 B2 * | 4/2010 | Ryser et al. | 99/295 |
| 2005/0106288 A1 | 5/2005 | Blanc et al. | |
| 2006/0230941 A1 | 10/2006 | Ryser et al. | |
| 2009/0293736 A1 * | 12/2009 | Jarisch | 99/295 |

FOREIGN PATENT DOCUMENTS

| | | |
|---|---|---|
| DE | 694 33 324 | 9/2004 |
| EP | 0 735 837 B1 | 10/1996 |
| EP | 1 529 469 B1 | 5/2005 |
| EP | 1 721 553 A1 | 11/2006 |
| EP | 1 859 714 B1 | 11/2007 |
| RU | 2 236 810 C2 | 9/2004 |
| WO | 2005/004683 A1 | 1/2005 |
| WO | 2005/034696 A1 | 4/2005 |
| WO | WO 2005/058111 A1 | 6/2005 |

OTHER PUBLICATIONS

Decision on Grant dated Dec. 2, 2011 for Russian Application No. 2009103909 together with English language translation.

\* cited by examiner

*Primary Examiner* — Reginald L Alexander
(74) *Attorney, Agent, or Firm* — Scully, Scott, Murphy & Presser, P.C.

(57) ABSTRACT

An infusion assembly, particularly for machines for preparing beverages, comprising a first shoulder and a second shoulder which face each other and are adapted to define internally a space for the movement of a piston, a dispensing assembly being arranged between the first and second shoulders, means for locking a capsule being provided, the piston being rigidly coupled to the locking means in order to move the locking means from an open position to a closed position in which the capsule is accommodated within the dispensing assembly.

19 Claims, 13 Drawing Sheets

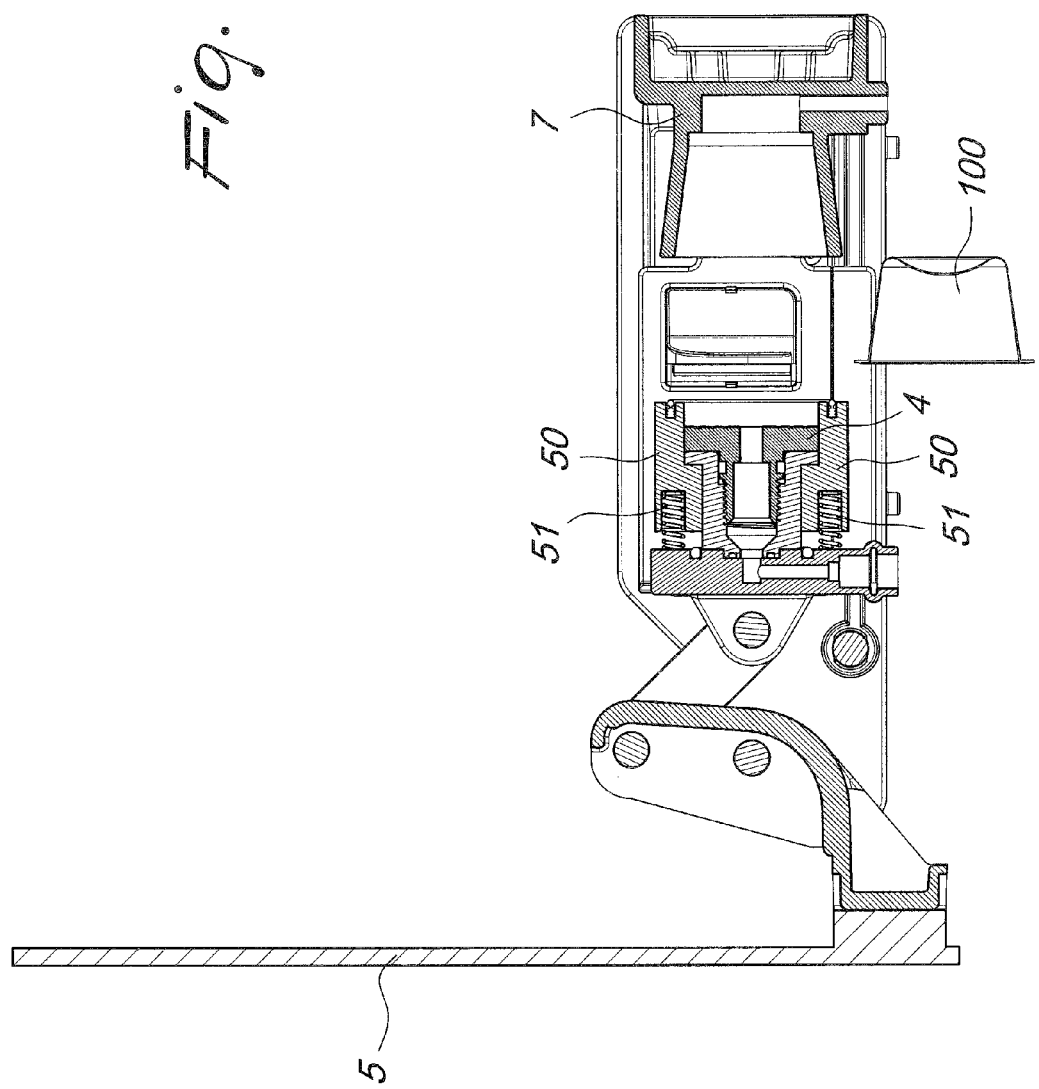

INFUSION ASSEMBLY FOR BEVERAGE PREPARING MACHINE

TECHNICAL FIELD

The present invention relates to an infusion assembly for a beverage preparing machine.

More particularly, the invention relates to an infusion assembly for a machine for preparing beverages such as coffee, tea, cappuccino and the like.

BACKGROUND ART

As is known, machines for preparing beverages such as coffee, tea, cappuccino and the like are used both in workplaces and in households and are increasingly widespread owing to the fact that the prepared beverages have a quality which usually is equal to what can be obtained in a bar.

The use of so-called capsules, i.e., specific sealed containers designed to be inserted in an infusion assembly which allows to release the contents of the capsule and thus prepare the beverage for dispensing to the user, with subsequent disposal of the capsule, is also increasingly widespread.

The diffusion of capsules is due to the fact that the user has at his disposal an extremely simple, effective and quick means for preparing the beverage, without having to dose ingredients and possibly without dirtying the surrounding environment.

Moreover, the use of capsules simplifies considerably the use of automatic machines for preparing beverages in general, since the user is not required, for example in the case of coffee, to fill a dosage unit with the required amount of coffee, to connect the dosage unit to the machine and then wait for the coffee to be dispensed. In the case of capsules, the user simply has to insert the capsule as it is into an appropriate cavity, operate the closure lever and wait for the machine to dispense the beverage for which the capsule has been prepared.

Many automatic and semiautomatic assemblies are available commercially and are designed to use a capsule for dispensing beverages. There are assemblies in which the capsule is inserted from above, from the front, laterally or by means of a traditional method which uses a filter supporting arm, as occurs for conventional machines to be used in bars.

However, increasing demand is oriented toward infusion assemblies which, at the end of the dispensing process, are capable of expelling the used capsule, relieving the user from the inconvenience of getting dirty or of dirtying the environment that surrounds the machine and of having to handle the used capsule.

Capsules are commercially available which are composed of two or more parts made of thermoplastic material, aluminum or other materials in order to ensure good preservation of the product.

In conventional automatic and semiautomatic infusion assemblies, the capsule, while the beverage is being dispensed, is for example surrounded by two movable jaws, which contain it, and when the new capsule is introduced it pushes and expels the preceding one.

The system described above is simple and clean, but the used capsule (which is still full of beverage preparation, for example coffee) remains hot in the infusion chamber until the machine is used again by introducing the next capsule.

Another known type of infusion assembly provides a horizontal assembly with an opening for inserting the capsule, and positioning occurs by means of two fixed guides, in which there is an abutment beyond which the aluminum rim of the capsule can move, the capsule being moved into the dispensing position by way of the backward thrust of the infusion chamber, which in turn is actuated by the lever. When the lever is opened, the chamber retracts and the rim of the capsule strikes the fixed guide, and thus the capsule is released and falls spontaneously.

There are also infusion assemblies in which the arms that hold the capsule are external, with problems as regards space occupation. Finally, there are also infusion assemblies in which the dispensing assembly is movable and the arms that hold the capsule are instead fixed.

DISCLOSURE OF THE INVENTION

The aim of the present invention is to provide an infusion assembly particularly for machines for preparing beverages in which both the lateral dimensions and the general compactness of the infusion assembly are improved with respect to known types of infusion assemblies.

Within this aim, an object of the present invention is to provide an infusion assembly particularly for machines for preparing beverages in which the dispensing assembly remains fixed while the arms that surround the capsule move.

Another object of the present invention is to provide an infusion assembly particularly for machines for preparing beverages which is highly reliable, relatively simple to provide and at competitive costs.

This aim and these and other objects, which will become better apparent hereinafter, are achieved by an infusion assembly, particularly for machines for preparing beverages, comprising a first shoulder and a second shoulder which face each other and are adapted to define internally a space for the movement of a piston, a dispensing assembly being arranged between said first and second shoulders, means for locking a capsule being provided, characterized in that said piston is rigidly coupled to said locking means in order to move said locking means from an open position to a closed position in which said capsule is accommodated within said dispensing assembly.

BRIEF DESCRIPTION OF THE DRAWINGS

Further characteristics and advantages of the invention will become better apparent from the description of preferred but not exclusive embodiments of the infusion assembly according to the present invention, illustrated by way of non-limiting examples in the accompanying drawings, wherein:

FIG. 13 is a transverse sectional view of the infusion assembly of FIGS. 8 to 12 in the fully open position.

WAYS OF CARRYING OUT THE INVENTION

Figure 1:
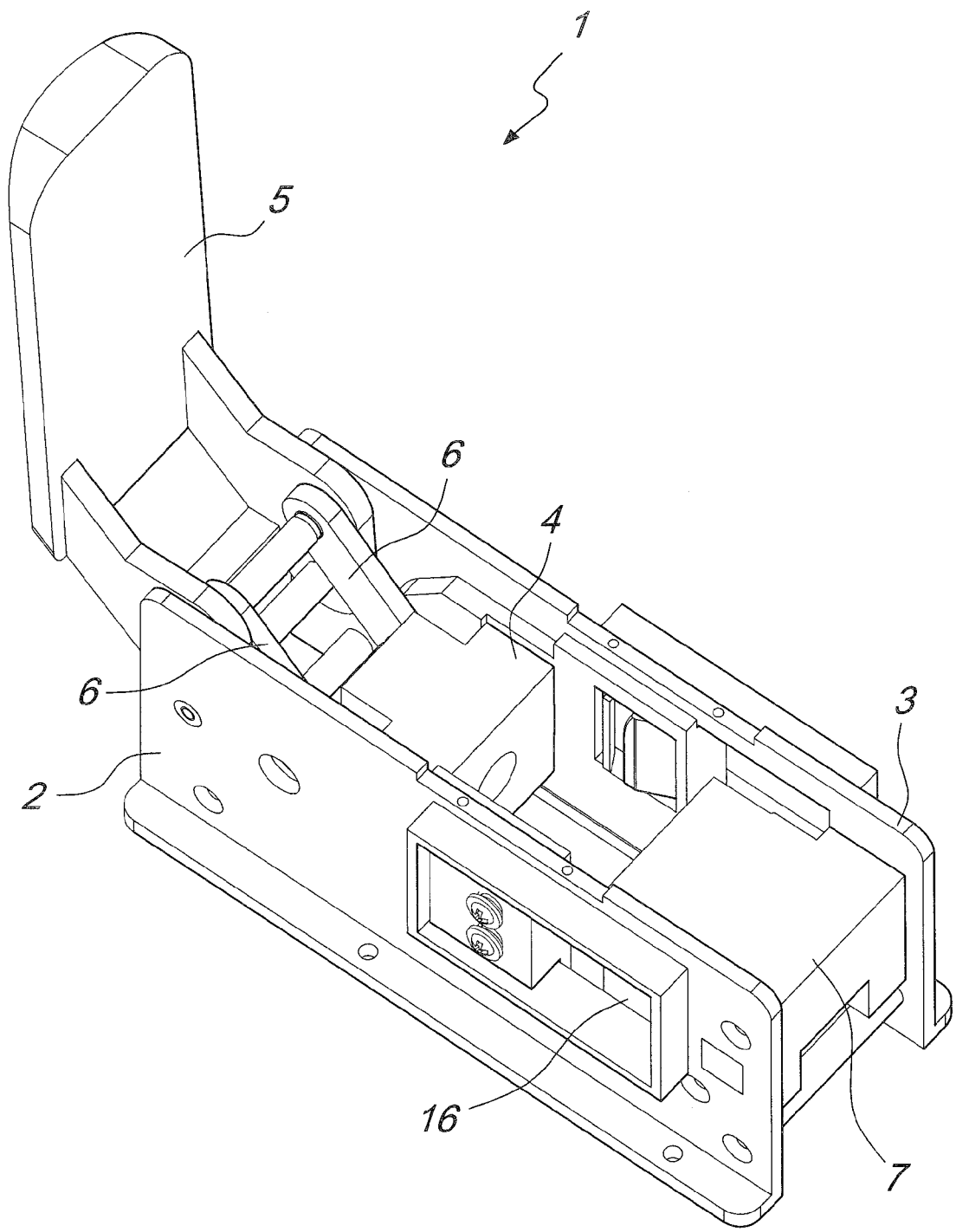
FIG. 1 is a perspective view of the infusion assembly according to the present invention, according to a first embodiment.

With reference to the figures, the infusion assembly according to the present invention, according to a first embodiment thereof, generally designated by the reference numeral 1, comprises two shoulders 2 and 3, which face each other and are adapted to define a space for accommodating internally a piston 4 for supporting a capsule, which is connected to lever means 5 by means of two mutually opposite lever systems 6, which allow the piston 4 to move between the first shoulder 2 and the second shoulder 3 toward and away from a dispensing assembly 7 which is thus fixed.

Conveniently, means for locking the capsule are connected to the cylinder 4 and are conveniently constituted by an additional pair of shoulders 10 and 11, which form a cavity 12 within which blocks 13 can move elastically transversely with respect to the final extension of the infusion assembly; such blocks can be compressed elastically within the cavity 12 by elastic means 14 which are kept precompressed by screw means 15.

The additional shoulders 10 and 11 are adapted to slide respectively within openings 16 provided at each of the shoulders 2 and 3.

The blocks 13 are conveniently provided with a slot 17 which is adapted to engage the rim of a capsule for preparing the infusion of beverages, with the slot 17 delimited, toward the piston 4, by an element 18, which forms its wall and can be flexible or substantially rigid.

With the solution proposed above, the lever means are internal with respect to the pair of shoulders 2 and 3, consequently reducing the space occupation of the infusion assembly as a whole, and moreover the dispensing assembly 7 is fixed while means for locking the capsule and then releasing it are rigidly coupled to the piston 4, which can move toward and away with respect to the dispensing assembly 7, due to the action of the lever means 5 and of the pair of mutually opposite lever systems 6.

Conveniently, each of the blocks 13 is contoured so as to have an inclined plane 20 which is arranged so that its inclination protrudes with respect to the first and second shoulders 2 and 3, so as to allow it, during the closure stroke of the infusion assembly, to divaricate as a consequence of the interference with the dispensing assembly 7, which is fixed.

Figure 2:
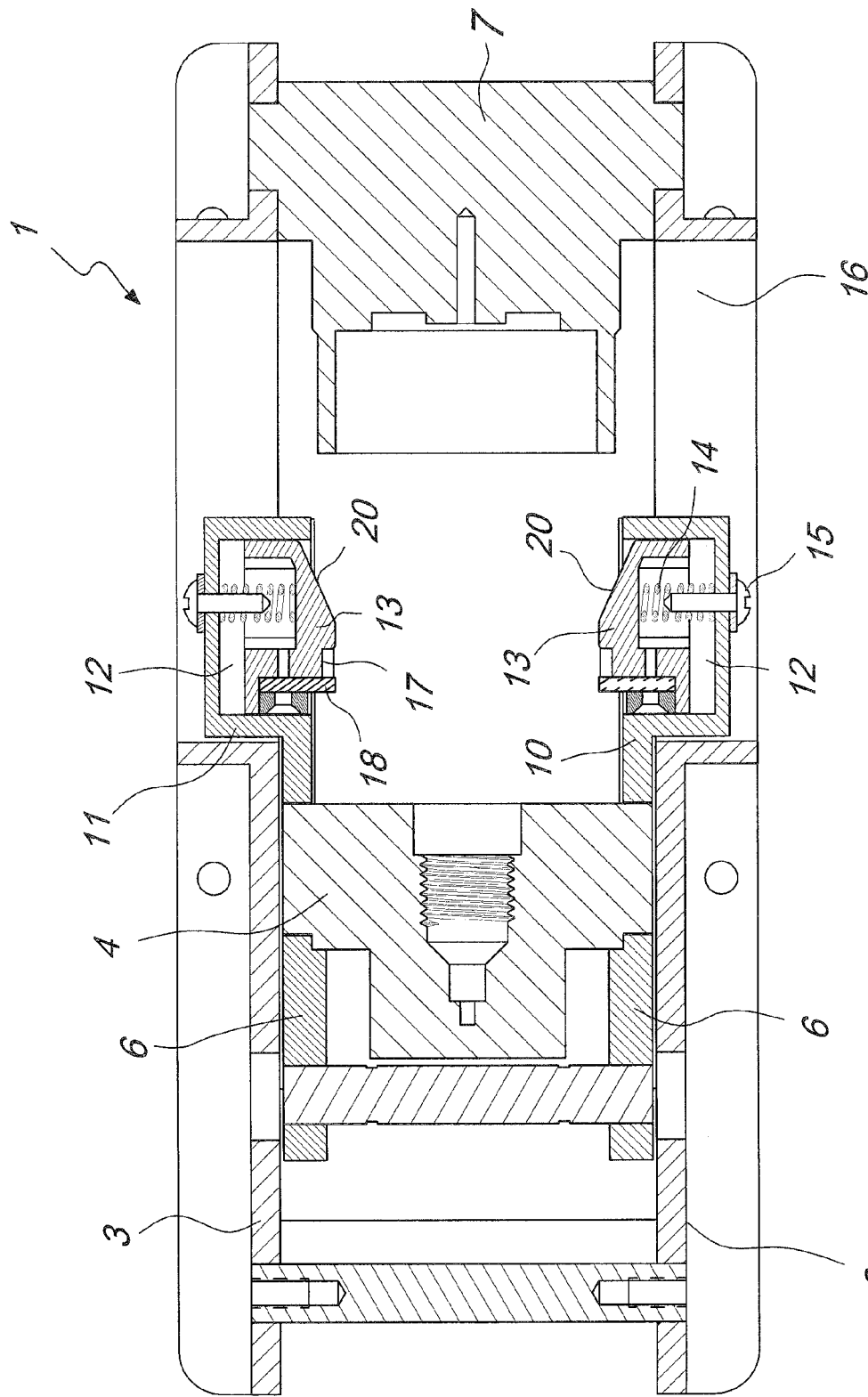
FIG. 2 is a longitudinal sectional view of the infusion assembly shown in FIG. 1, in the open position.
Figure 3:
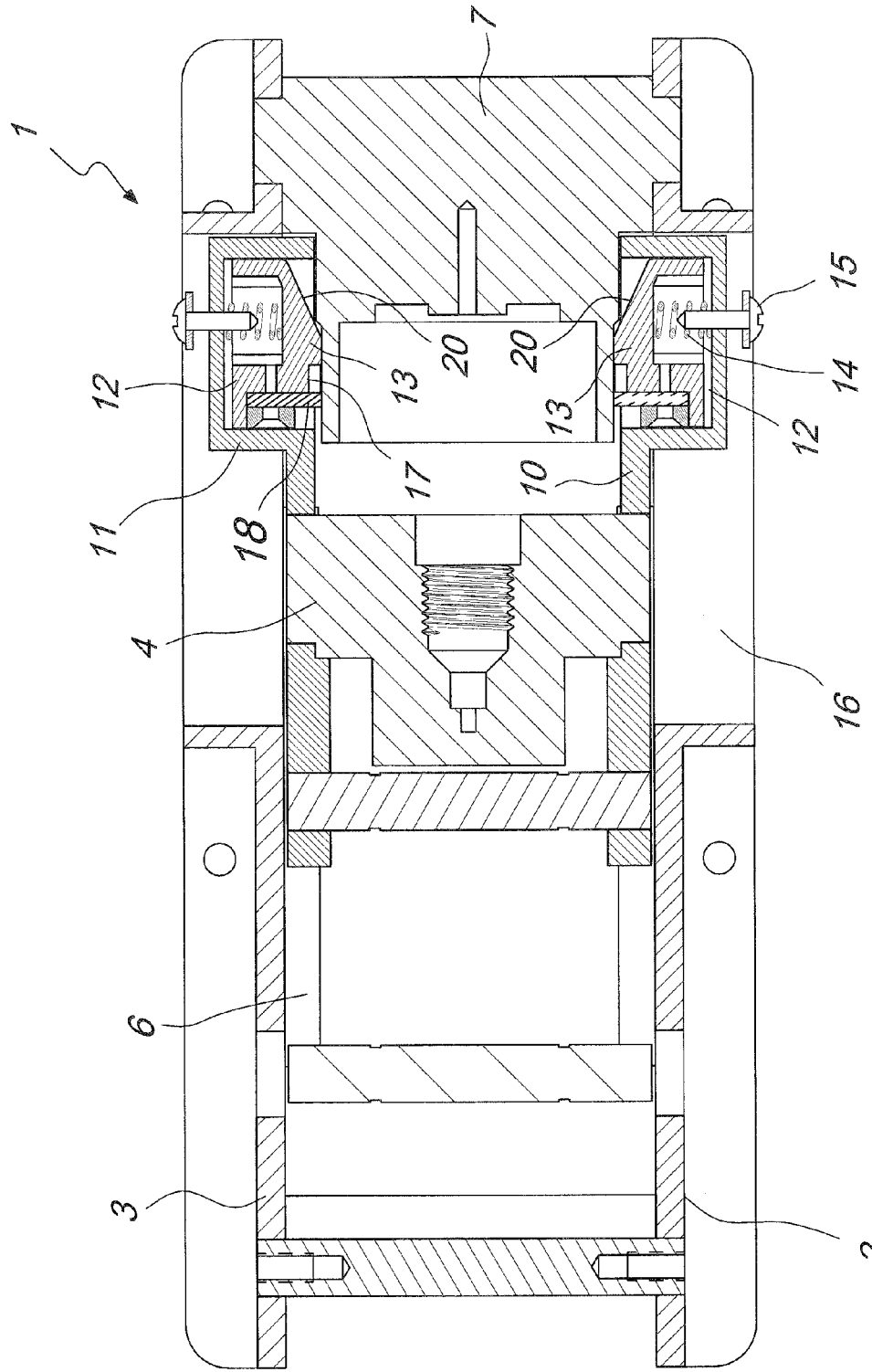
FIG. 3 is a longitudinal sectional view of the infusion assembly of FIGS. 1 and 2, in the closed position.
Figure 4:
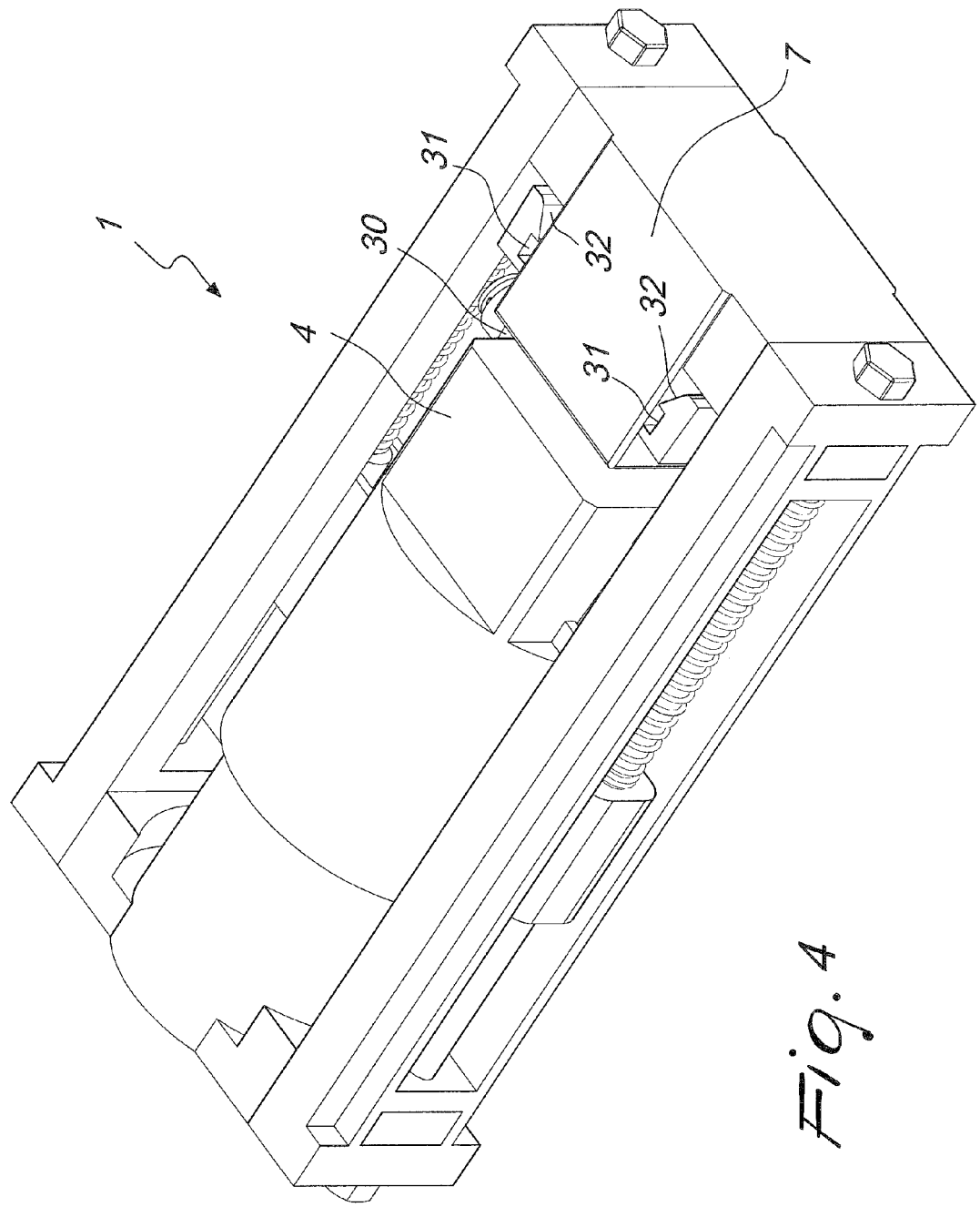
FIG. 4 is a perspective view of the infusion assembly according to the invention, according to a second embodiment, in the closed position.

In this way, as shown in FIG. 2, the blocks 13 protrude toward the central region of the infusion assembly, i.e., the space formed by the two shoulders 2 and 3, with the blocks which protrude with respect to the additional shoulders 10 and 11.

In this position, the capsule, not shown, can be arranged so that its rim enters the slot 17 of each of the mutually opposite blocks 13.

During the closure stroke, by actuating the lever means 5, the piston 4, with the corresponding blocks 13 rigidly coupled thereto, moves forward, and the blocks 13 interfere with the fixed dispensing assembly 7, so that the blocks 13 slide, along their inclined plane 20, along the edge of the dispensing assembly 7 and are compressed within the cavities 12, in contrast with the force of the elastic means 14, so that the capsule is accommodated within the dispensing assembly, disengaging from the slots 17.

In this embodiment, therefore, the infusion assembly according to the invention has the peculiarity that its dispensing assembly is fixed and the cylinder 4 can move together with the capsule locking means.

The second embodiment, shown in FIGS. 4 to 7, is an embodiment in which the actuation of the piston 4 toward the fixed dispensing assembly 7 occurs hydraulically.

The peculiarity of this second embodiment, in which identical numerals with respect to the first embodiment designate identical or similar elements, is that the piston 4 supports directly the locking means which are constituted by two mutually opposite arms 30 provided with a slot 31 within which the rim of the capsule which contains the preparation for the beverage is inserted, the arms having, at the end of the arm which is not retained, an inclined plane 32 which allows to divaricate the arms 30 when they interfere with the dispensing assembly 7.

The end of the arms 30 which lies opposite the end of the arm in which the inclined plane 32 is formed has a rounded shape 33, which is accommodated within an appropriately provided seat 34 formed within the body of the piston 4, allowing the rounded part 33 to turn slightly within the seat 34 when the inclined plane 32 of the arms 30 comes into contact with the fixed part 7.

The arms are kept compressed against the body of the piston 4 by elastic means 34, which are kept conveniently compressed by way of screw means 35.

Figure 5:
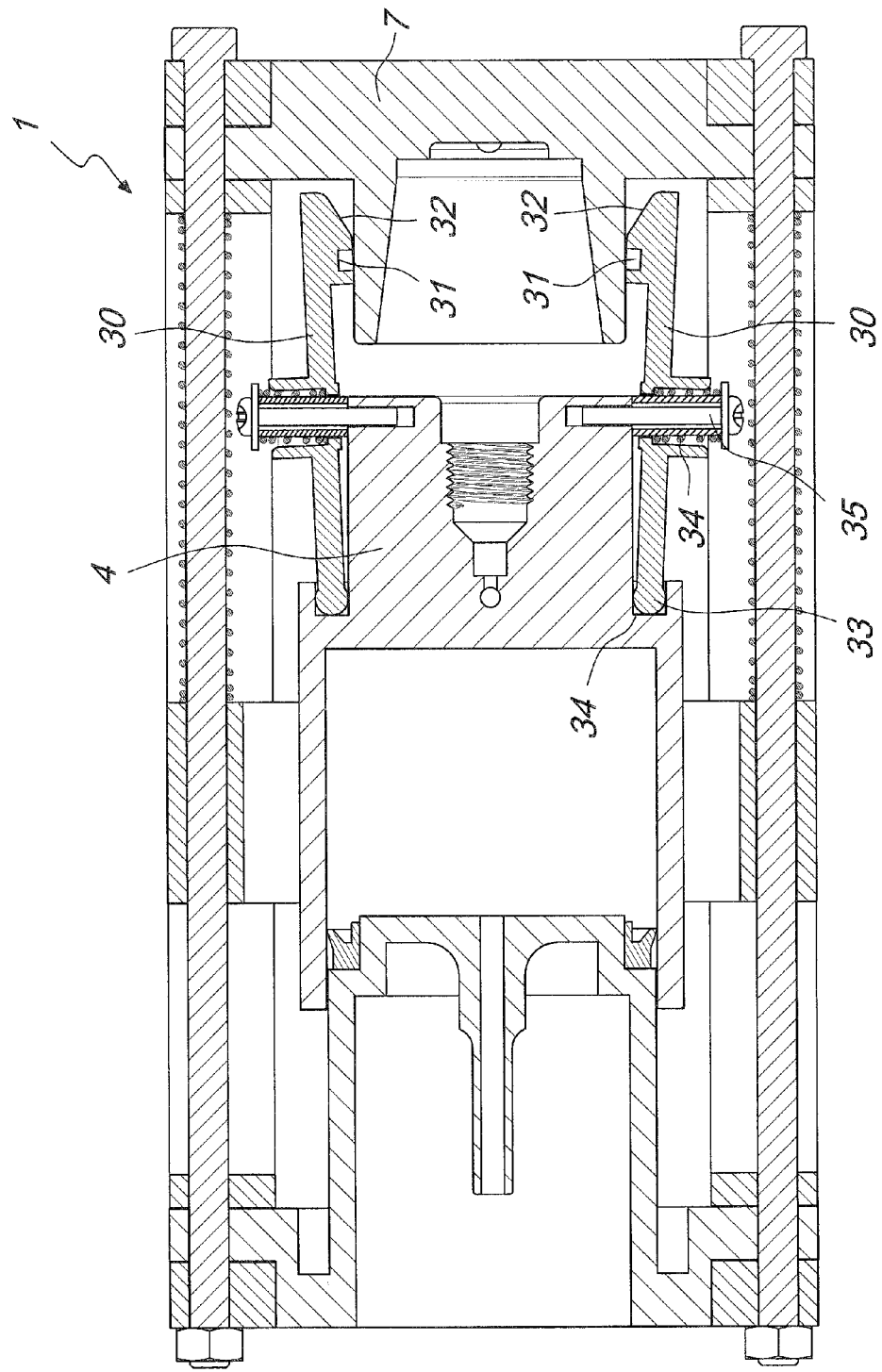
FIG. 5 is a longitudinal sectional view of the infusion assembly of FIG. 4, again in the closed position.
Figure 6:
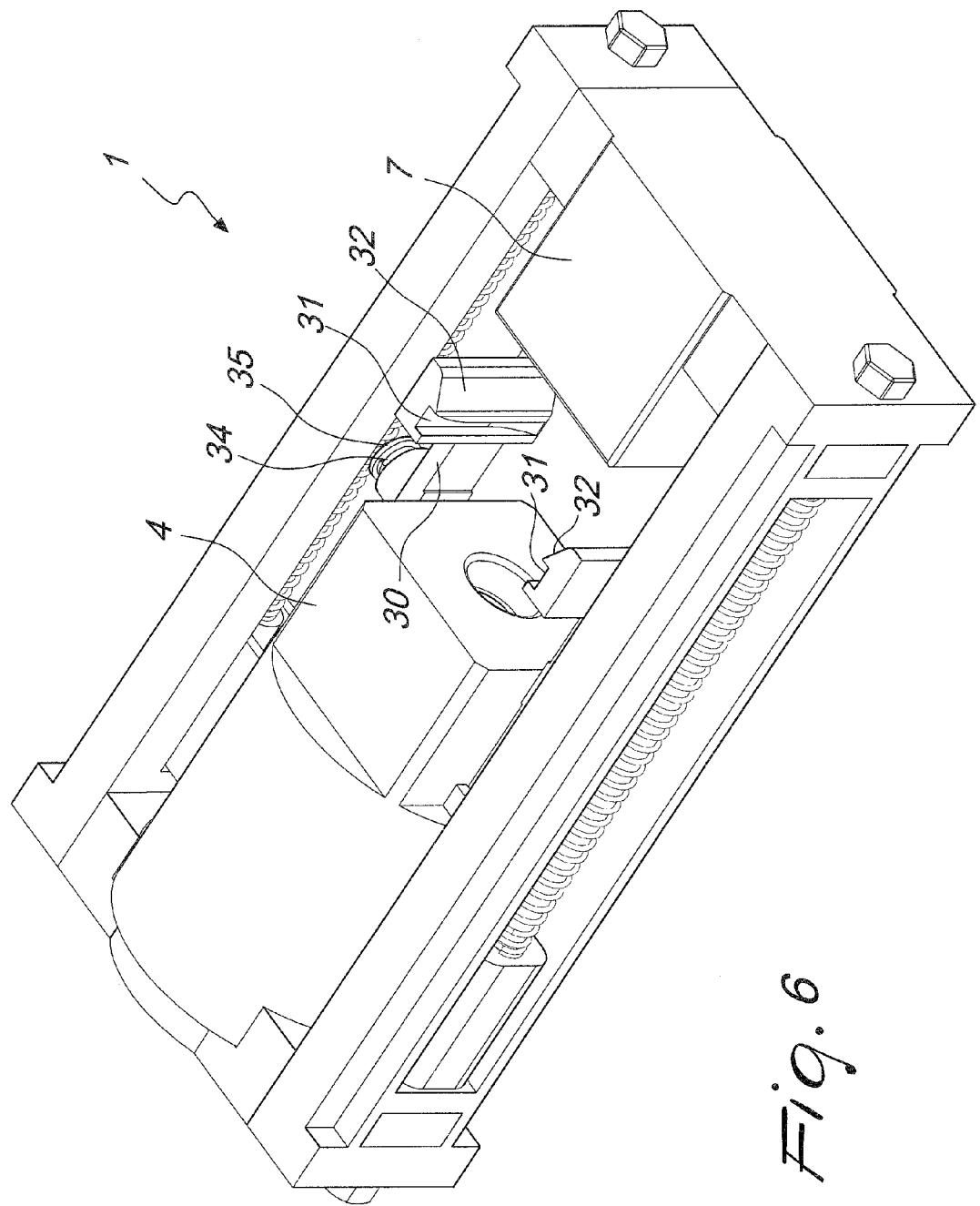
FIG. 6 is a perspective view of the infusion assembly according to the second embodiment, in the open position.
Figure 7:
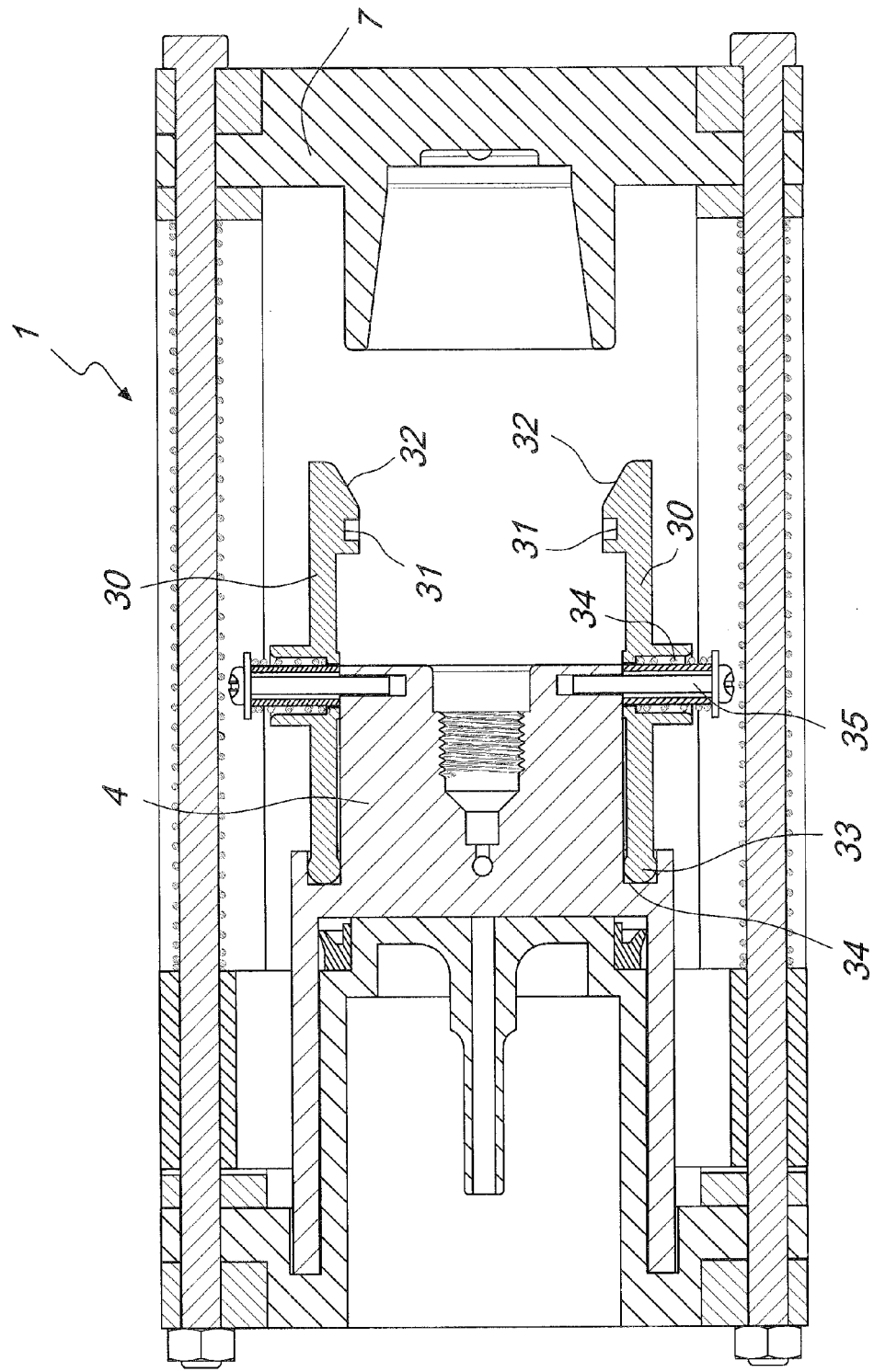
FIG. 7 is a longitudinal sectional view of the infusion assembly according to the second embodiment, in the open position.

When the arms 30 start to interfere with the fixed part 7 and divaricate, the elastic means 34 are compressed further, thus allowing the rotation of the rounded end 33 of the arms 30 and therefore their angled arrangement toward the outside of the pair of shoulders, as shown in FIG. 5.

The solution proposed above therefore allows to have a pair of arms which also are completely internal with respect to the infusion assembly, thus reducing space occupation. The second embodiment uses a hydraulic actuation of the piston instead of an actuation by way of the lever means of the first embodiment.

FIGS. 8 to 13 are views of a third embodiment of the infusion assembly according to the present invention.

The peculiarity of the third embodiment resides in that means are provided which are adapted to separate the front surface of the capsule 100 from the piston 4.

Figure 8:
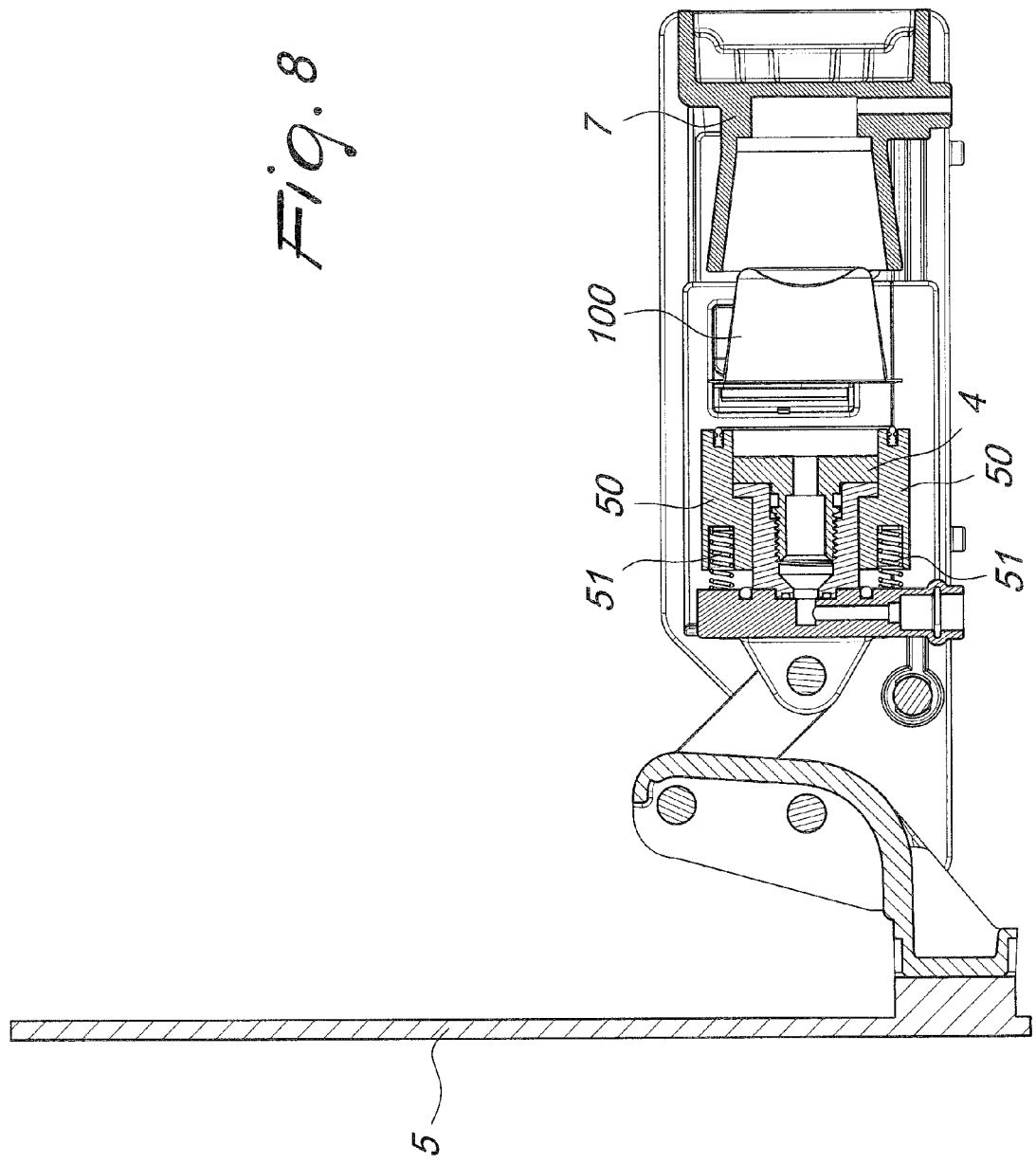
FIG. 8 is a transverse sectional view of a third embodiment of the infusion assembly according to the present invention.
Figure 9:
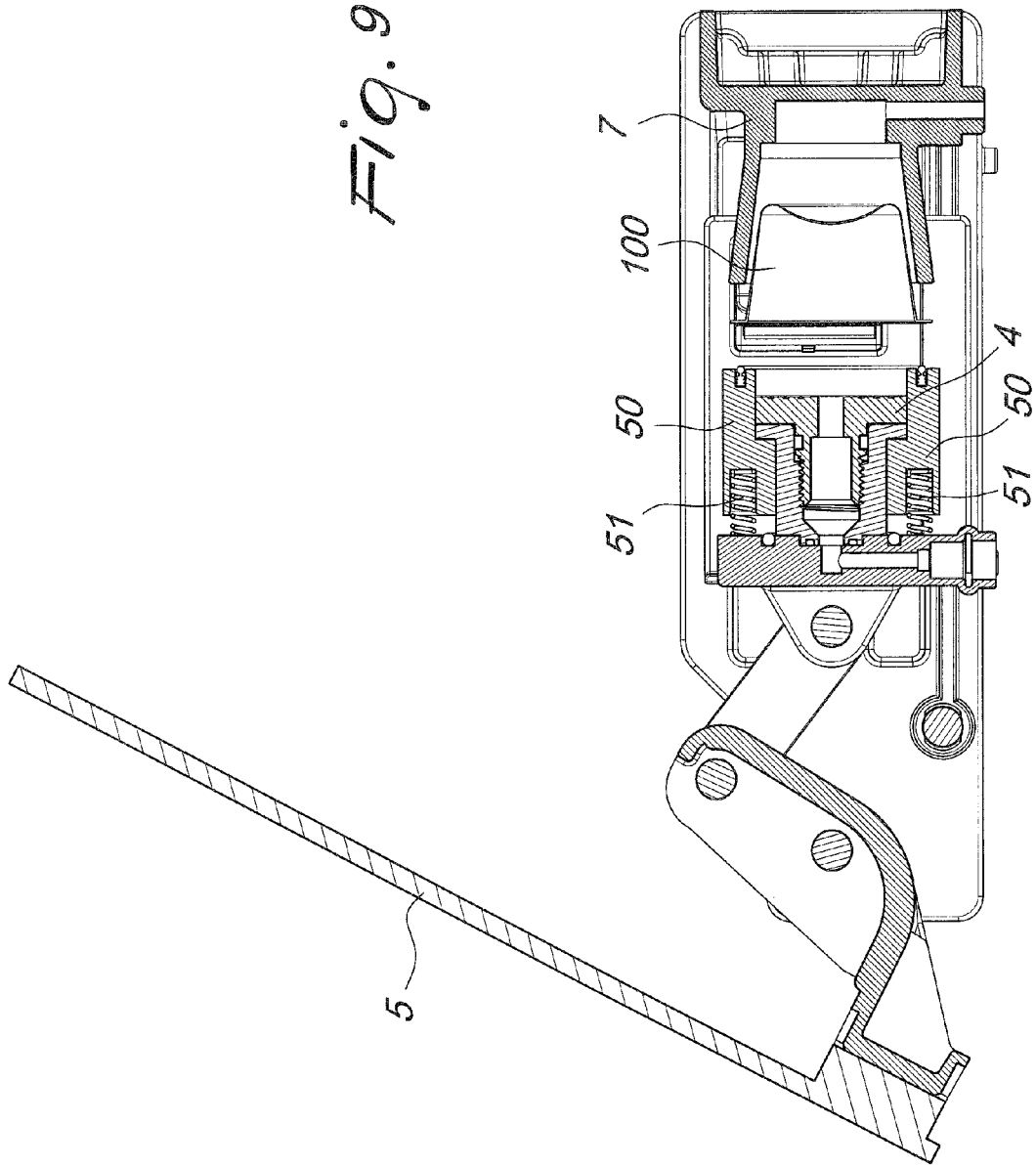
FIG. 9 is a transverse sectional view of the infusion assembly of FIG. 8 during its motion for closure.

When the assembly closes, upon actuation of the lever 5, the means for separating the front surface of the capsule, which are designated by the reference numeral 50, rest against the capsule 100, and in the last part of the movement stroke the means 50 move backwardly until they reach the infusion position, compressing elastic means 51 which are designed to subsequently push again into the initial position, as shown in FIG. 8, the means 50.

Conveniently, the means 50 are therefore arranged coaxially with respect to the piston 4, can move with the piston 4 and with respect to it thanks to the presence of the elastic means 51.

FIGS. 9 to 13 show in detail the sequence of movements starting from the initial position shown in FIG. 8.

Figure 10:
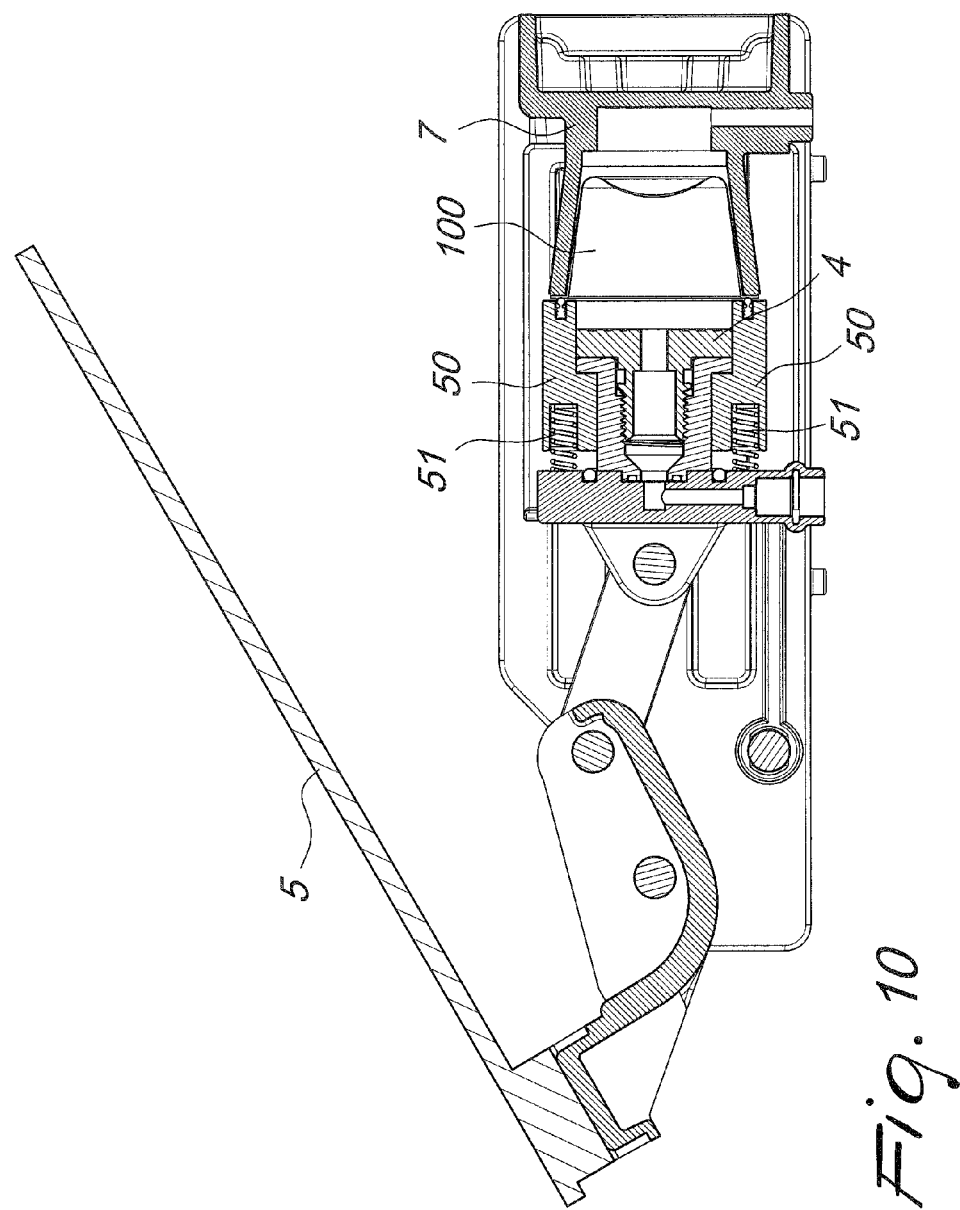
FIG. 10 is a transverse sectional view of the infusion assembly of FIGS. 8 and 9 during its motion for further closure.

By first actuating the closure lever 5, the piston 4 and the means 50 advance toward the dispensing assembly 7, which accommodates the capsule 100, and the capsule is brought to the closure position by means of the opposite blocks 13. FIG. 10 illustrates the contact between the means 50 and the capsule 100, moment in which the capsule 100 is accommodated completely within the dispensing assembly 7. From this point until the infusion assembly closes completely, the means 50 retract until the front surface of the capsule 100 is closed onto the piston 4.

Figure 11:
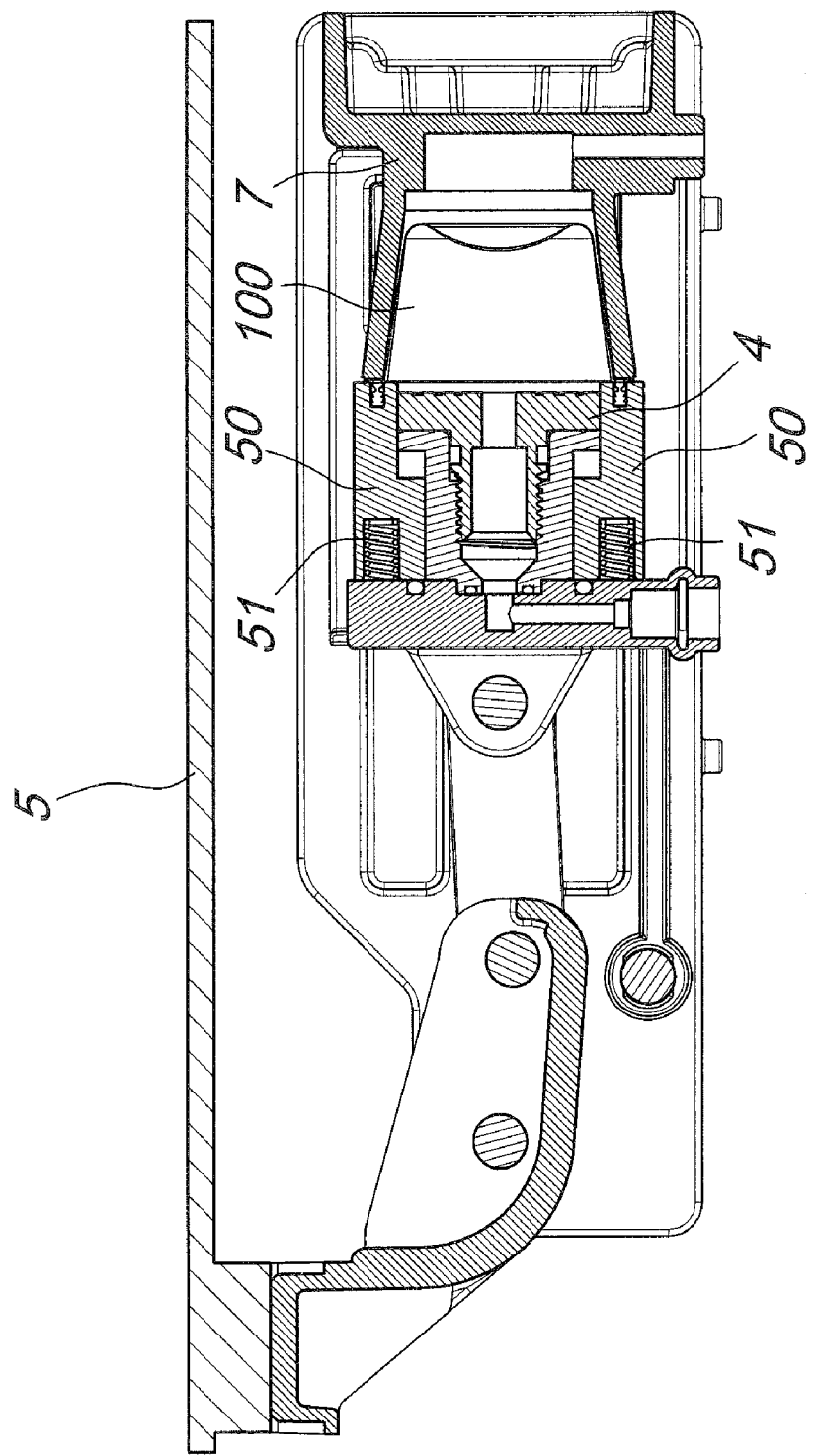
FIG. 11 is a transverse sectional view of the infusion assembly of FIGS. 8-10 in the full closure position.

FIG. 11 shows the full closure position, in which the means 50 are moved fully back into the infusion position, and in this position the elastic means 51 are compressed and the piston 4 is in the correct infusion position. This position is maintained from the beginning to the end of the infusion process.

Figure 12:
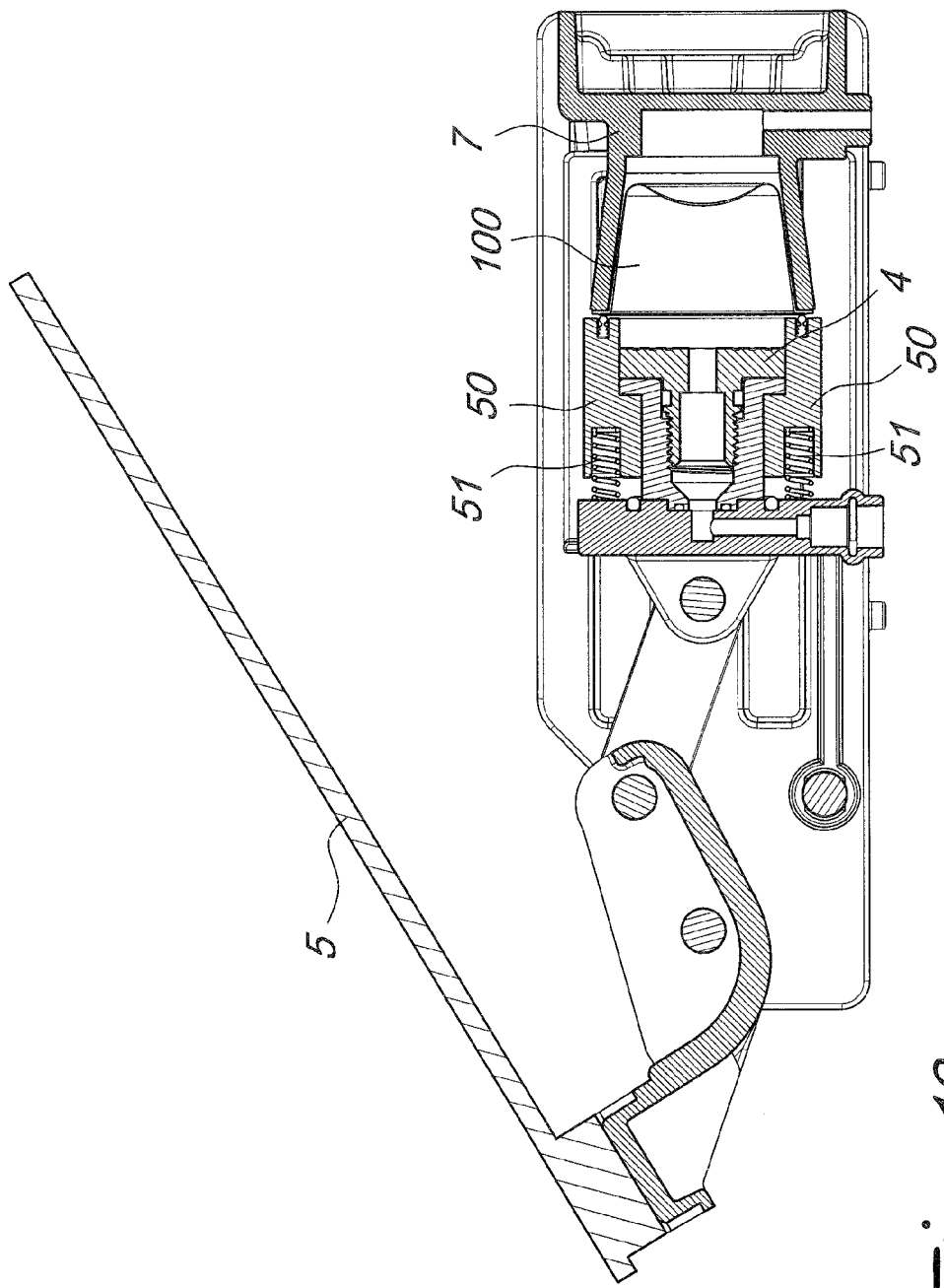
FIG. 12 is a transverse sectional view of the infusion assembly of FIGS. 8-11 in the open position after coffee infusion.

FIG. 12 is a view of the step for opening the infusion assembly after coffee infusion by actuating the lever 5. The piston 4 moves backwardly and the means 50 continue to rest against the front surface of the capsule 100, due to the thrust of the elastic means 51, accordingly separating the front surface of the capsule 100 assuredly from any element provided on the surface of the piston which might have piercing injectors or points. From this point onward until the infusion assembly opens completely and the capsule 100 consequently falls, operation is similar to what has been described in the preceding embodiments.

Finally, FIG. 13 illustrates the fully open position of the infusion assembly, in which the capsule 100 falls due to the mutually opposite blocks 13; at that moment, the infusion assembly is ready to receive a subsequent capsule.

In practice it has been found that the infusion assembly according to the present invention fully achieves the intended aim and objects, since it allows to have a reduced space occupation, simplified actuation, by moving the piston with the means for locking the capsule connected thereto, keeping the dispensing assembly fixed.

The infusion assembly thus conceived is susceptible of numerous modifications and variations, all of which are within the scope of the appended claims; all the details may further be replaced with other technically equivalent elements.

In practice, the materials used, as well as the contingent shapes and dimensions, may be any according to requirements and to the state of the art.

The invention claimed is:

1. An infusion assembly, particularly for machines for preparing beverages, comprising a first shoulder and a second shoulder which face each other and are adapted to define internally a space for the movement of a piston, a dispensing assembly being arranged between said first and second shoulders, means for locking a capsule being provided,
wherein said piston is rigidly coupled to said locking means in order to move said locking means from an open position to a closed position in which said capsule is accommodated within said dispensing assembly, and
wherein said locking means comprise an additional pair of shoulders which are adapted to face each other, each of said shoulders of the additional pair of shoulders defining a cavity for accommodating a block provided with a slot for the engagement of a rim of said capsule.

2. The infusion assembly according to claim 1, wherein said piston is actuated by lever means.

3. The infusion assembly according to claim 1, wherein said piston is actuated hydraulically.

4. The infusion assembly according to claim 1, wherein said piston is actuated by gearmotors.

5. The infusion assembly according to claim 1, wherein said block is kept compressed within said cavity by way of elastic means.

6. The infusion assembly according to claim 1, wherein said block is provided with an inclined plane which is adapted to come into contact with said dispensing assembly.

7. The infusion assembly according to claim 1, wherein said block is arranged so that it protrudes from said cavity when said infusion assembly is in the open position and so that it is accommodated substantially completely within said cavity when said infusion assembly is in the closed position.

8. The infusion assembly according to claim 1, further comprising means adapted to allow separation of a surface of said capsule from said piston.

9. The infusion assembly according to claim 8, wherein said means adapted to allow the separation of the surface of said capsule are arranged coaxially with respect to said piston and can move together with said piston and with respect to said piston.

10. The infusion assembly according to claim 8, wherein said means adapted to allow separation of the surface of the capsule from said piston are pushed by elastic means.

11. An infusion assembly, particularly for machines for preparing beverages, comprising a first shoulder and a second shoulder which face each other and are adapted to define internally a space for the movement of a piston, a dispensing assembly being arranged between said first and second shoulders, means for locking a capsule being provided,
wherein said piston is rigidly coupled to said locking means in order to move said locking means from an open position to a closed position in which said capsule is accommodated within said dispensing assembly, and
wherein said locking means comprise two mutually opposite arms which are rigidly coupled to said piston, each of said arms having an end provided with a slot for the engagement of a rim of said capsule and an inclined plane to allow divarication of said arm when said arm interferes with said dispensing assembly.

12. The infusion assembly according to claim 11, wherein each of said arms is provided, at the end that lies opposite the end provided with said slot, with a rounded portion which is adapted to be accommodated in a seat provided in the body of said piston, said rounded end being adapted to rotate within said seat.

13. The infusion assembly according to claim 11, wherein each of said arms is coupled elastically to the body of the piston by way of elastic means which are adapted to allow a movement of said arm away from the body of the piston when said arm interferes with said dispensing assembly.

14. The infusion assembly according to claim 11, wherein said piston is actuated by lever means.

15. The infusion assembly according to claim 11, wherein said piston is actuated hydraulically.

16. The infusion assembly according to claim 11, wherein said piston is actuated by gearmotors.

17. The infusion assembly according to claim 11, further comprising means adapted to allow separation of a surface of said capsule from said piston.

18. The infusion assembly according to claim 17, wherein said means adapted to allow the separation of the surface of said capsule are arranged coaxially with respect to said piston and can move together with said piston and with respect to said piston.

19. The infusion assembly according to claim 17, wherein said means adapted to allow separation of the surface of the capsule from said piston are pushed by elastic means.

* * * * *